US006339788B1

(12) United States Patent
Geyer et al.

(10) Patent No.: US 6,339,788 B1
(45) Date of Patent: Jan. 15, 2002

(54) METHOD FOR ENCAPSULATING HARDWARE TO ALLOW MULTI-TASKING OF MICROCODE

(75) Inventors: Joel Erwin Geyer, Cary; Peter Anthony LaBerge, Apex, both of NC (US); Myrna Faye Milliser, Manassas, VA (US); Max Robert Povse, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/097,036

(22) Filed: Jun. 12, 1998

(51) Int. Cl.$^7$ .................................................. G06F 3/00
(52) U.S. Cl. ............................. 709/220; 713/100; 709/1
(58) Field of Search .................................. 709/220, 222, 709/1; 713/100; 710/2; 703/27; 716/9; 712/245

(56) References Cited

U.S. PATENT DOCUMENTS

| 3,665,415 A | | 5/1972 | Beard et al. ............. 340/172.5 |
| 4,843,606 A | | 6/1989 | Bux et al. ...................... 370/89 |
| 4,905,230 A | * | 2/1990 | Madge ...................... 370/85.5 |
| 5,410,709 A | | 4/1995 | Yu .............................. 395/725 |
| 5,488,714 A | * | 1/1996 | Skidmore ...................... 717/7 |
| 5,646,939 A | * | 7/1997 | Lindeborg .................. 370/258 |
| 5,649,111 A | * | 7/1997 | Rehquate .................... 709/249 |
| 5,655,154 A | * | 8/1997 | Jain ............................ 709/310 |
| 5,687,356 A | | 11/1997 | Basso et al. ................ 395/500 |
| 5,890,001 A | * | 3/1999 | Hall ............................ 710/240 |
| 6,035,340 A | * | 3/2000 | Fischer ....................... 709/249 |
| 6,175,569 B1 | * | 1/2001 | Ellington .................... 370/401 |

* cited by examiner

Primary Examiner—Eric Coleman
(74) Attorney, Agent, or Firm—Joscelyn G. Cockburn (57) ABSTRACT

The problem with sharing or multi-tasking a single microprocessor across multiple ports is that it requires an elaborate and costly effort to adapt, modify, and rewriting of existing microcode. Extensive effort has gone into the development and testing of existing microcode that supports Token Ring. The re-use of the microcode, mostly in an "as is" condition is required to increase effectiveness and reduce costs. The present invention resolves these problems. It further describes a method that easily encapsulates existing hardware and allows the use of existing microcode to be extended to a multi-tasking environment, at a substantially reduced cost and with greater efficiency. Another embodiment of this invention describes a system and method to reuse a single existing Token Ring macro with embedded processor and microcode for multiple ports on a chip.

25 Claims, 7 Drawing Sheets

FIG. 1
Token Ring network. An IBM Token Ring configuration with MSAUs.

FIG. 2

High Level Abstraction of a multi-MAC Chip Design

FIG. 3
High Level Design of Microcode to Support the Multi-MAC Algorithm

FIG. 4A 8-port Token-ring chip

FIG. 5

Access bus structure of the original Token-ring macro

FIG. 6

Bus Structure of Token-ring macro for Multi-port

METHOD FOR ENCAPSULATING HARDWARE TO ALLOW MULTI-TASKING OF MICROCODE

TECHNICAL FIELD

This invention relates to a method of encapsulating hardware on a chip to allow multi-tasking of microcode. An additional embodiment of the present invention involves a method to reuse a single existing "Token-Ring" embedded processor and microcode for multiple ports on a chip.

BACKGROUND OF THE INVENTION

Before going into the specific embodiments of the present invention, it would be most helpful to review the background on "Tokens" and "Token-Ring-Networks".

A token is a unique structure data object or message that circulates continuously among nodes of a token ring and describes the current state of the network. Before any node can send a message, the node must first wait to control the token. A token can also be considered as any nonreducible textural element in data that is being parsed-for example, the use in a program of a variable name, a reserved word, or an operator. Storing tokens as short codes shortens program files and speeds execution.

In authentication systems, some type of physical device, such as a card impregnated with a magnetic stripe, a smart card, or a calculator-like device that generates a password, must be in the individual's possession in order to access a network. The Token itself is not sufficient; the user must also be able to supply something memorized, such as a personal identification number (PIN). Combining "something you have' with "something you know", provides strong authentication.

In local area networks (LAN), a network protocol in which a special bit configuration(Token), is circulated among the work stations, is called "Token Passing". A node can send information across the network only if the node can obtain an available token, in which case the node converts the token into a data frame containing a network message. Nodes constantly monitor the network to catch data frames addressed to them. Because token-passing rules out the data collisions that occur when two devices begin transmitting at the same time, this channel access method is preferred for large, high-volume networks.

Figure 1:
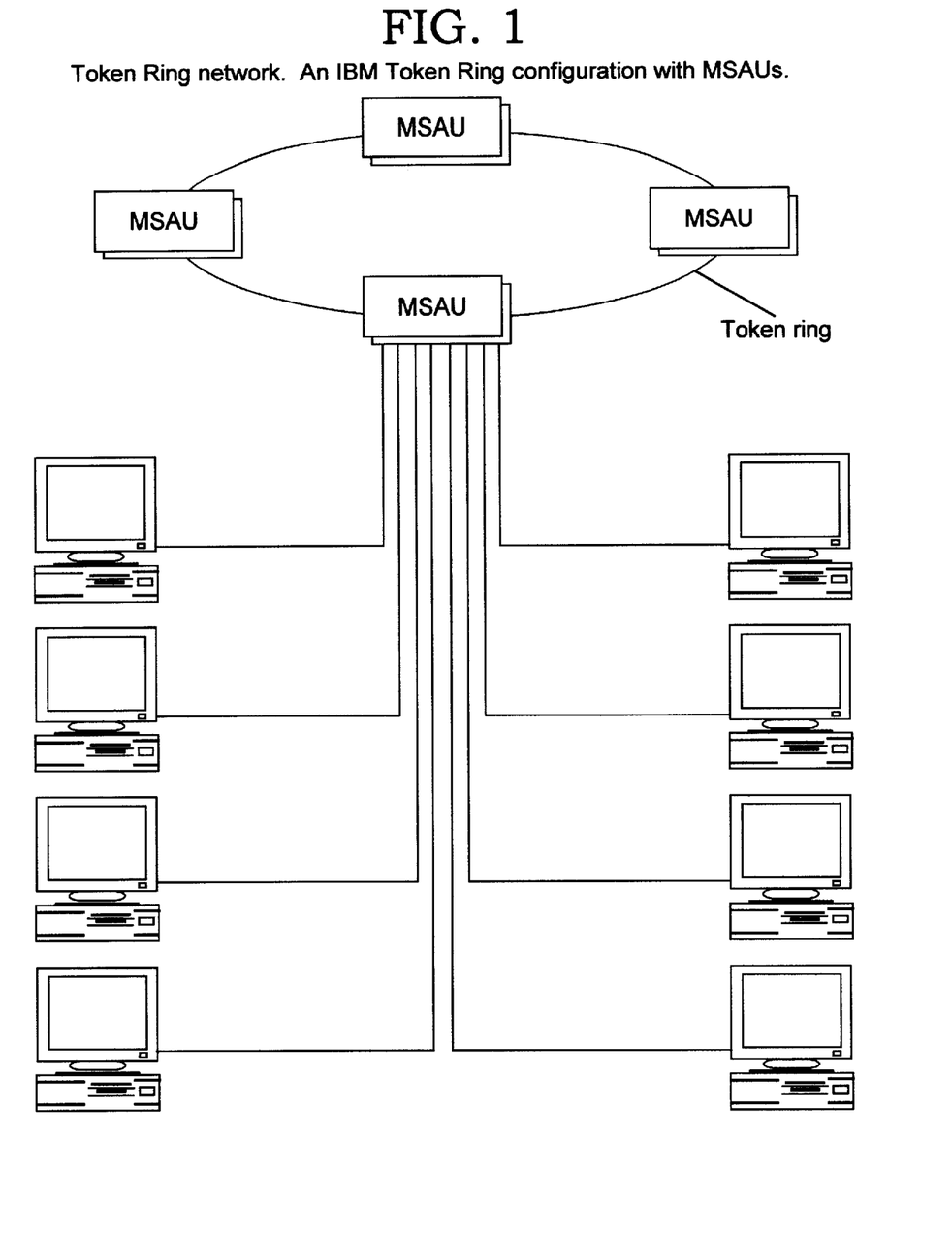
FIG. 1 Is an example of "Token Ring Representation" employing an IBM (TM) Multistation Access Unit at its hub (MSAUS)

The term, Token-Ring-Network , refers to a local area (LAN) architecture that combines token-passing with a hybrid star/ring technology developed by IBM Corporation, which employs a Multi-Access Unit at its hub as demonstrated in FIG. 1. This unit is wired with twist-pair cable in a star configuration with up to 255 workstations, but the resulting network is actually a decentralized ring network.

Thus a token ring network is a local area network formed in a ring or closed loop topology that employs token passing as a means of regulating traffic on the line. On a token ring network, a token governing the right to transmit is passed from one station to the next station in a physical circle. If a station has information to transmit, it "seizes" the token, marks it as being in use, and inserts the information. The "busy" token, plus message, is then passed around the circle, copied when it arrives at its destination, and eventually returns to the sender. The Sender removes the attached message and then passes the freed token to the next station in line. Token ring networks are defined in the IEEE 802.5 standards.

A token-passing, ring-shaped local area network developed by the IBM Corporation, operates at 4 or 16 megabits per second. With a standard telephone wiring, the token-ring-network uses the star-shaped clusters of up to eight workstations connected to a wiring concentrator, as noted above, which is called a Multistation Access Unit or "MSAU". This in turn is connected to the main ring.

The development of a follow-on Token Ring Switch product has one of its requirements, the need to be far less costly than its predecessor. One classical way to accomplish this is through the integration of multiple ports into a single VLSI chip. The simple replication of an individual port, a multiple number of times and duplicating all circuits, results only in limited or minor cost reduction.

Another approach is to replicate only the minimal amount of chip circuitry for a single port operation, a multiple number of times. Then, integrate a single copy of hardware that can support the major functions common to all ports. One of the largest functions required in a Token Ring chip is the microprocessor and the microcode it executes to support media access control (MAC) layered protocols. MAC, in a computer network, represents the layer that controls under what circumstances a workstation can get access to the physical media in order to originate a message to another workstation.

SUMMARY OF THE INVENTION he problem with sharing or multi-tasking a single microprocessor across multiple ports is that it requires an elaborate and costly effort to adapt, modify, and rewriting of existing microcode. Extensive effort has gone into the development and testing of existing microcode that supports Token Ring. The re-use of the microcode, mostly in an "as is" condition is required to increase effectiveness and reduce costs.

The present invention resolves these problems. It further describes a method that easily encapsulates existing hardware and allows the use of existing microcode to be extended to a multi-tasking environment at a substantially reduced cost and with greater efficiency.

Another embodiment of this invention describes a system and method to reuse a single existing Token Ring macro with embedded processor and microcode for multiple ports on a chip.

BRIEF DESCRIPTION OR THE DRAWINGS

The novel features believed characteristic of the present invention are set forth in the appended claims. The invention itself, however, as well as the mode of use, further objects and advantages thereof, will best be understood by reference to the following detailed description of illustrative embodiments when read in conjunction with the accompanying drawings, wherein:

DETAILED DESCRIPTION OF THE PRESENT INVENTION

Figure 2:
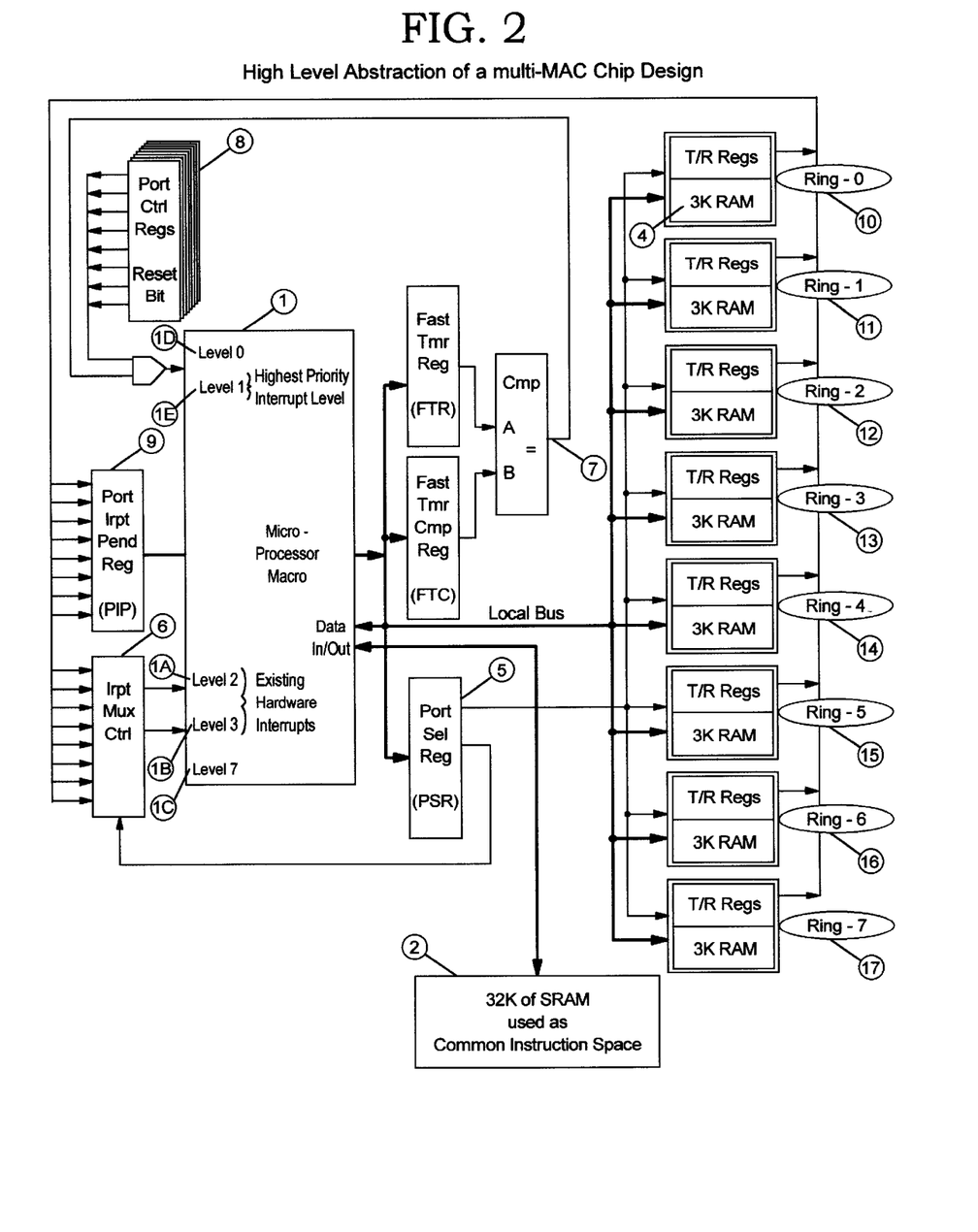
FIG. 2 Represents a High Level Abstraction of a Multi-MAC Chip Design.

As noted, the present invention represents a method to readily encapsulate existing hardware and allow the use of existing microcode to be extended to a multi-tasking environment. The details of this invention are shown in FIG. 2, which represents a single microprocessor at 1, that supports eight Token Ring ports, at 10, 11, 12, 13, 14, 15, 16, and 17, using a common instruction space at 2. This instruction space is only 32K bytes deep allowing it to reside within a SRAM macro inside the VLSI chip at 2. Each individual port has its own copy of Token Ring Registers at 3 and RAM at 4 hardware. The "state" of each port resides within the first 2K of RAM space. The particular port that the microcode works with is determined by the value in the PSR- Port Select Register at 5. Three bits within the PSR select one of the eight unique RAM spaces and Token Ring register copies. Three additional bits within the PSR control the Interrupt Multiplexor at 6, that supplies the level 2 and level 3 hardware generated interrupts to the microprocessor.

The concept illustrated in FIG. 2, is that of a single microprocessor macro controlling the operation of eight Token-Ring interfaces. The objective is to accomplish this with an approach that minimizes the impacts to both microcode and hardware. It is desirable to be able to use as much of the existing Token Ring microcode as possible. Additionally, since the new chip will start from a previous design, a second goal is not to have to redesign the existing microprocessor macro.

The existing Token Ring microcode is well seasoned by having been used for a long time period. This brings with it a stability earned through years of debugging effort. With ever increasing emphasis on "re-usability" it becomes apparent that the ability to limit the changes to this microcode is an admirable design objective.

The existing microcode knows about a "single" set of hardware which it can control, and respond to, via external interrupts on level 2 at position 1A and level 3 at position 1B. This code provides diagnostic capability, power-on/initialization routines, Host command processing, and interrupt service routines. Once the diagnostic and initialization routines execute, the base operational code can be viewed as an interrupt driven/event processing program.

The present invention has a multi-MAC control algorithm that allows most of the existing code base to be used "as is". The new chip contains a single microprocessor that will remain interrupt driven, only it has more interrupts to service than before. These "more" interrupts come from having eight copies of the port hardware to control over, at any given point the existing code can only know about interrupts it receives from a single port. These interrupts are shown in FIG. 2 as feeding into the microprocessor macro on priority level 2 at position 1A and level 3 at position 1B. The existing microprocessor only has eight interrupts levels in total, and not all levels can be used for external hardware interrupts. There simply are not enough free interrupt levels in the existing design to support 16 external unique interrupts (2 per Port). Also, the simple combining of interrupts together and having software figure out which port they are coming from by reading bits in a register, would cause a massive code change and re-design. The solution is to limit the number of active interrupts so they remain the same as today-on level 2 at position 1A and level 3 at position 1B. This is accomplished by multiplexing the eight copies of hardware interrupts using a dual 8:1 multiplexor to feed the microprocessor macro on external interrupt pins for level 2 at position 1A and level 3 at position 1B.

In order to utilize the existing code, with its knowledge of a single port of hardware, levels 1 and 7 are used as a "control point" from which port selection and switching occurs. Level 7 at position 1C is the lowest priority level and level 1 at position 1E is the highest priority level used in "normal" code execution. The only higher level, level 0 at position 1D, is used for error handling-adapter check handler and the error interrupt vector handler.

Level 1 at position 1E, in this multi-MAC design is used to support the expiration of a "Hog" timer at position 7. The Hog timer is a hardware function used during the allocation of "CPU time" to a specific port. The function is implemented using a Fast Timer Register (FTR), a Fast Timer Compare Register (FTC), and a comparator for generating an interrupt when the two are equal. The FTR is a free running counter clocked at a 1 megahertz rate. When the CPU is allocated to a specific port the value of time allocate to that port is calculated by adding a "Hog Time" to the FTR and placing that value in the FTC. If the allotted time expires before returning control to the CPU, a high priority interrupt is generated. The "Hog Timer" is used to prevent any one port from "hogging" the CPU.

Because level 1, at position 1E, is the highest priority level for code execution, it is also used to support a software initiated "single" port reset. Fig.2 shows the existence of eight (1 per port) Port Control Registers at position 8. The Host software can initiate a reset of an individual port by setting a bit in the appropriate Port Control Register.

The new algorithm uses entrance into level 7, at position 1C, with its low priority implication of "no higher interrupt work pending", as a control point for sampling for interrupts on all active ports. This sampling is done through the Port Interrupt Pending (PIP) register at position 9. By using the PSR, the level 7 code, at position 2, can direct the interrupts to the correct RAM memory space. This provides a mechanism for the proper sequencing of the correct context space associated with each port's hardware, allowing for a single copy of code space to be shared by each port. The new control algorithm uses entrance into level 1, at position 1E, with its high priority implication, for preventing problems on one port from crippling all eight ports.

Thus in summary, the algorithm for multi-MAC will allow the existing base microcode to execute. It uses level 7, at position 1C, to provide a non-preemptive interrupt source and port selection sequencing control. It uses level 1, at position 1E, to ensure that the level 7, at position 1C, port sequencing code has the opportunity to execute.

The following, details the New Control Code for Port Selection. The architecture of interrupt priority logic within the microprocessor is used in structuring the implementation of the new multi-MAC control algorithm. When the microcode does a return to the lowest interrupt priority level 7, at position 1C, it indicates all higher levels of interrupts have been serviced and that this particular port is in a wait state awaiting further events. The highest interrupt priority level 1, at position 1E, can be used to force a time-slice mechanism onto CPU allocation. Those two mechanisms are used together in structuring the control code for multi-MAC support.

Figure 3:
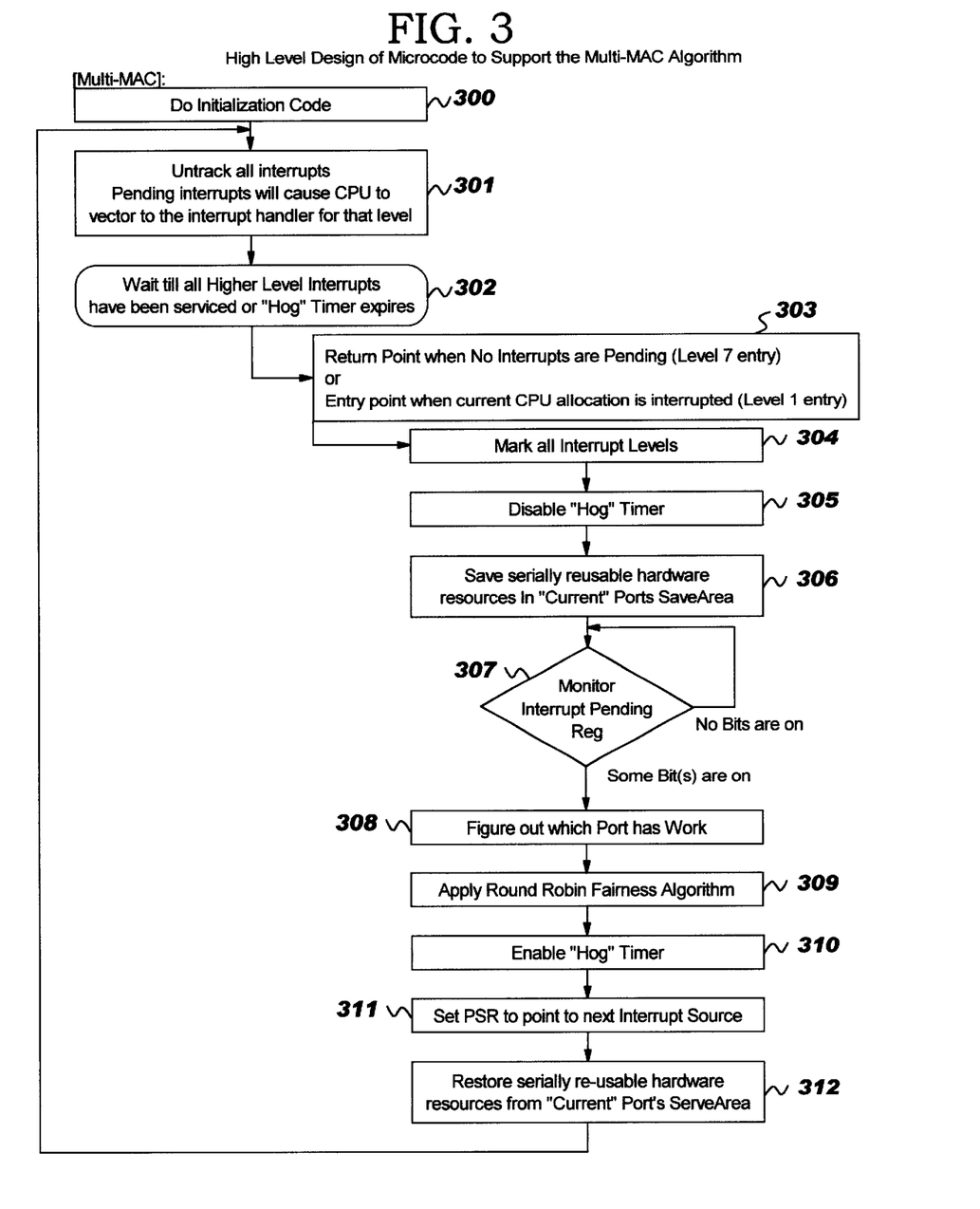
FIG. 3 Represents a Flow diagram of a High Level Design of Microcode to Support the Multi-Mac Algorithm FIG. 4A Diagram is a representation of an 8-Port Token-Ring Chip for the reuse of a single existing token-ring embedded processor and microcode for multiple ports on a chip.

The Flow Chart of the algorithm is shown in FIG. 3, and as follows. The method involves the initialization code at 300, followed by an unmask all interrupts at 301. Pending interrupts will cause the CPU to vector to the interrupt handler for that level at 303, or wait until all higher level interrupts have been serviced or "Hog" timer expires at 302.

The major code path is entered from FIG. 2 level 7, at position 1C, when there are no interrupts pending at FIG. 3 at 303. This occurs upon completion of work associated with the currently selected port. It can also be entered from FIG. 2 level 1, at position 1E, when the current CPU allocation is interrupted by the expiration of the "Hog" timer. Upon entry into the algorithm the code immediately masks all levels, at FIG. 3 at 304. This guarantees the completion of the control algorithm for selecting the next port to get CPU resources.

The code then disables the "Hog" timer at 305. This hardware function is enabled prior to allocating the CPU to a specific port. Well behaved ports should complete their work before this timer expires. The code then saves away the contents of serially re-useable hardware resources in the currently selected port's RAM save area at 306. These represent "single copy" resources whose value must be saved when the algorithm is interrupted. An example of when this is needed is when the control algorithm is invoked because of the expiration of the "Hog Timer". The code then monitors the Port Interrupt Pending (PIP) register at 307. If no Bits are on the process repeats back to 307, when some bits are on, the next action is to figure out, at 308, which ports have work.

Because multiple ports can have interrupts pending, the code begins the implementation of a round robin algorithm, at 309, of the CPU to enabled ports based on a polling of interrupt pending activity. This algorithm ensures the constant allocation of the CPU to ports having work to do, in a non-priority/equal sharing arrangement. The next step is that the code calculates a new time value for the "Hog" timer function and enables it once again to prevent the port about to be allocated the CPU, from monopolizing it, at 310. The code then changes the Port Select Register to switch to the correct RAM and Token Ring Register set to allow interrupts from that port to pass through to the microprocessor at 311.

This is followed by the code restoring, at 312, the value to any serially re-useable resources that have been interrupted. This is only needed when the control algorithm is invoked from FIG. 2, level 1 at position 1E. When invoked from FIG. 2, level 7, at position 1C, the control algorithm cycles automatically on a clean interrupt boundary and there is nothing that needs restoring.

With the next interrupt source correctly matched to the newly selected current port hardware, an unmask of interrupt levels is done at 301. This allows the pending interrupt to cause a level switch to the level's interrupt handler using the correct RAM bank for saving and restoring program context, such as registers and RAM variables.

As noted earlier, an additional embodiment of the present invention involves a method to reuse a single existing "Token-Ring" embedded processor and microcode for multiple ports on a chip.

Currently Token-ring switches have a single token-ring macro chip for each port which includes an embedded processor with code in an external Flash ROM memory to handle MAC layer protocols. Flash ROM memory can be defined as flash memory, which is a type of nonvolatile memory. Flash memory is similar to EEPROM memory in function but it must be erased in blocks, whereas EEPROM can be erased one byte at a time.

The cost of this solution when expanded to many ports such as 96, gets extremely high and is thus commercially non-competitive. The additional embodiment of the present invention provides a solution to this problem. This solution described below represents a process by which an existing Token-Ring macro and a single embedded processor can be used to put multiple ports on a single chip.

Figure 4A:
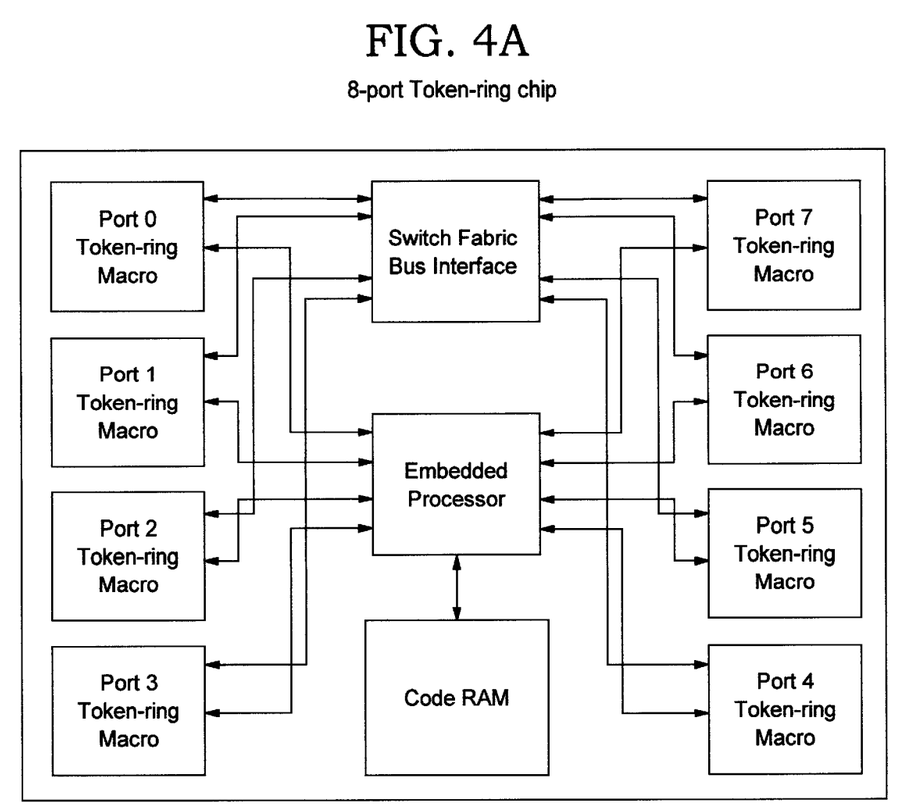

FIG. 4A shows a high level diagram of the current implementation of the multi-port Token Ring chip. A single existing embedded processor was used to control all ports. The processor/macro combination that existed did not meet the needed performance requirements to have this single processor control all ports. As a result, the following changes were made as a result of the present invention.

Figure 4B:
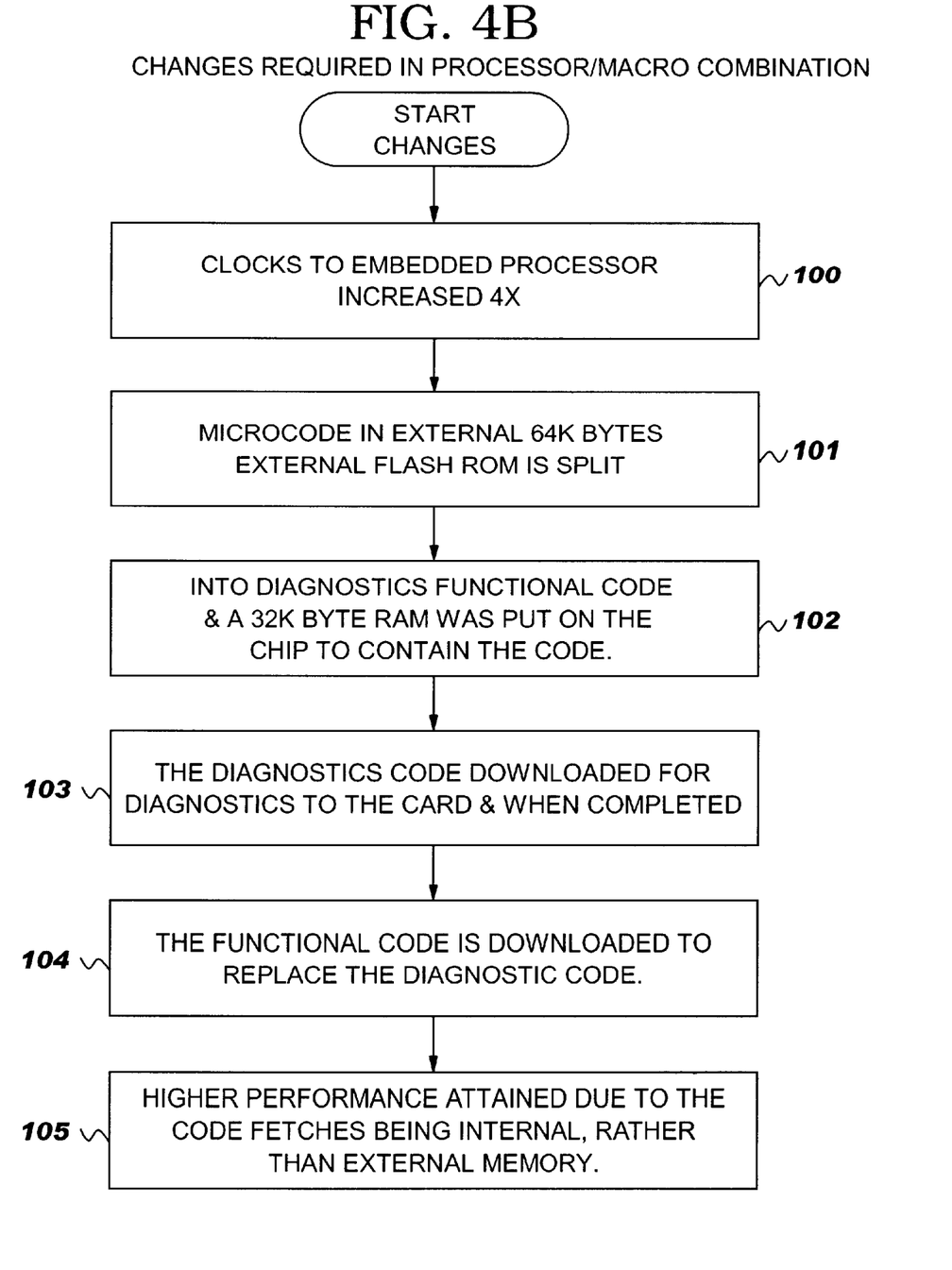
FIG. 4B This Flow Chart represents the changes required in the processor/macro combination so that it meets the needed performance requirements to have a single processor control all ports.

FIG. 4B outlines the process of increasing higher performance. This is started by having the clocks to the embedded processor increased in speed up to 4 times, FIG. 4B at 100. The micro-code in the 64K Bytes external Flash ROM memory was split at 101 into diagnostics and functional code at 102 and a 32 KByte RAM was put on the chip to contain the code.

The diagnostic code is downloaded for diagnostics to the card (defined as a circuit board or expansion board) and when this is complete at 103, the functional code is downloaded to replace the diagnostic code at 104. This allows a much higher performance due to the code fetches being internal rather than in external memory at 105.

Figure 5:
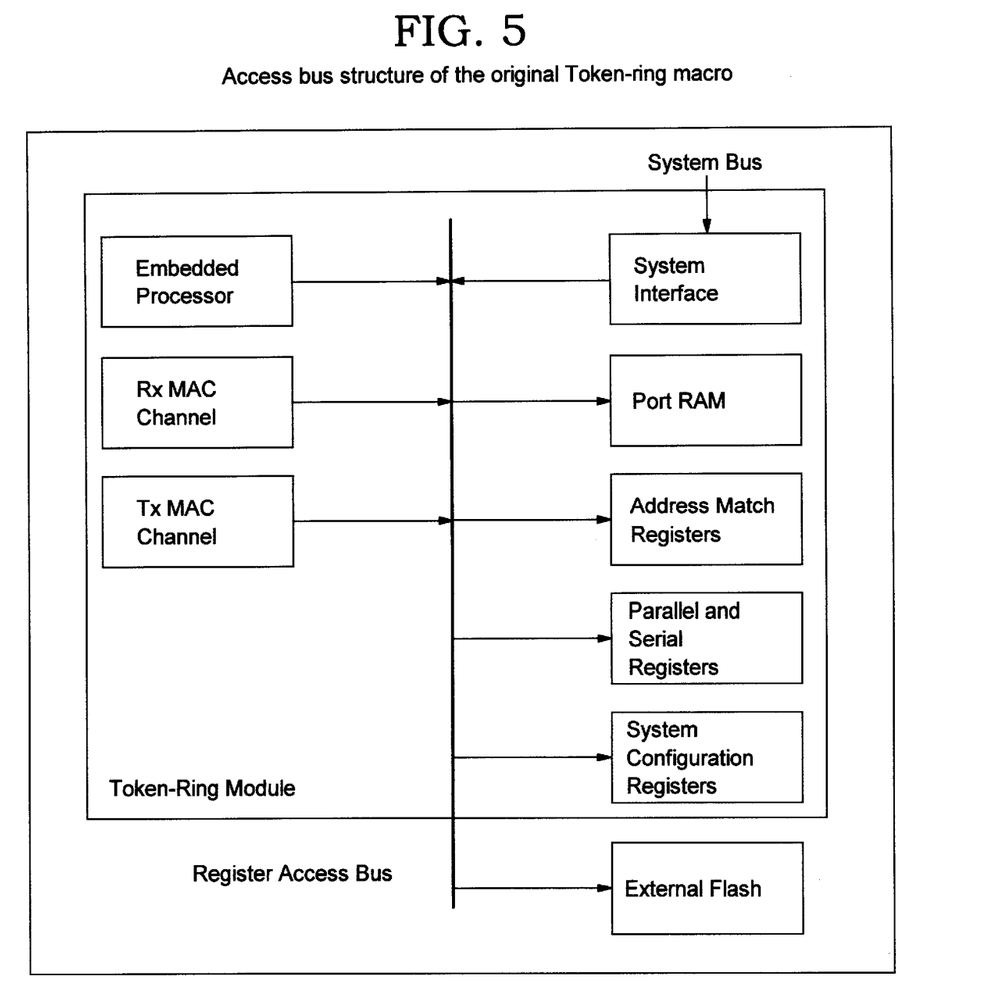
FIG. 5 This diagram represents the access bus structure of the original Token-Ring Macro for the reuse of a single existing token-ring embedded processor and micro-code for multiple ports on a chip.
Figure 6:
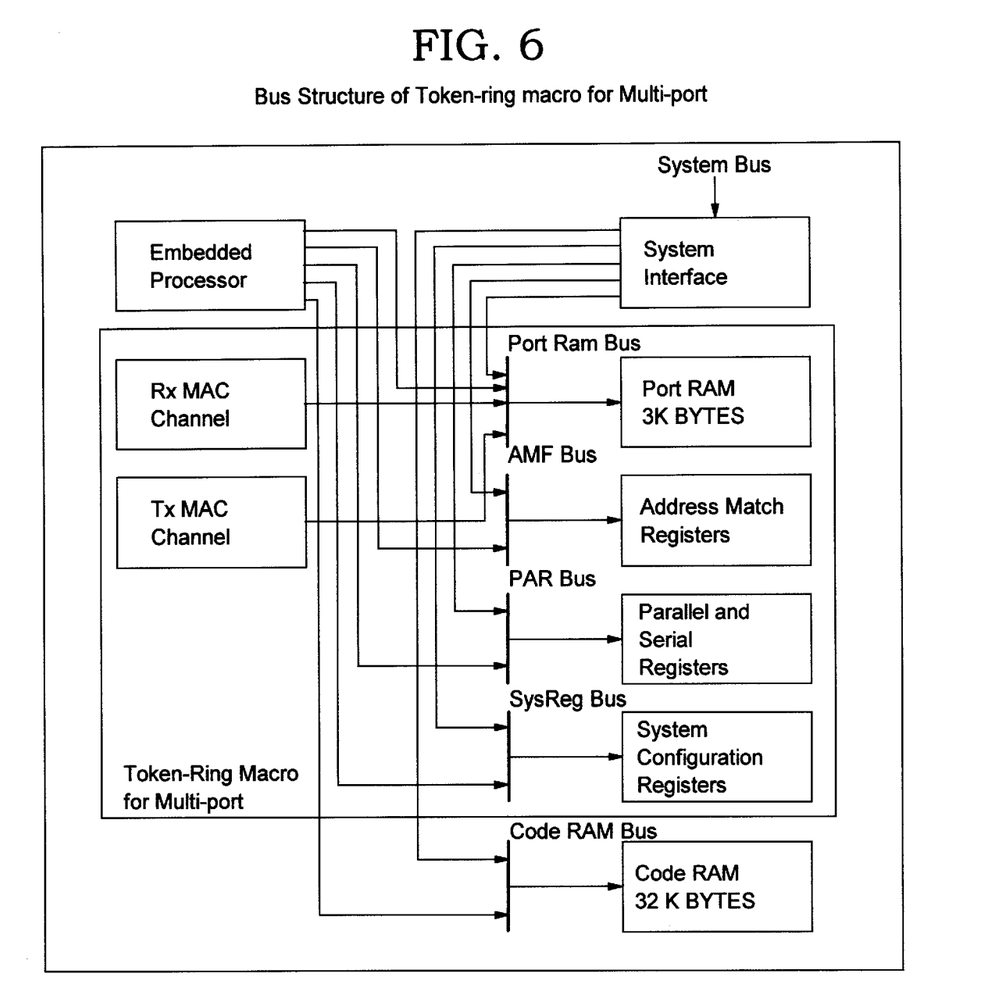
FIG. 6 This is a representation of the Bus Structure of Token-Ring Macro for Multi-Port for the reuse of a single existing token-ring embedded processor and microcode for multiple ports on a chip.

FIGS. 5 and 6 shows a comparison as to how the access bus on the original Token Ring macro was split into several independent buses so port operations become independent from other ports and accesses to/from registers and RAMs by the system become more independent from the embedded processor. This increases the performance of the embedded processor since it has many fewer wait states due to accesses from the system processor or the ports. A piece of code was measured and it was noted that the above described invention resulted in an increase of 10 times in the performance of the embedded processor.

We claim:

1. A system to facilitate multi-tasking of existing microcode hardware, comprising:

means for encapsulating said existing microcode hardware;

means for extending said existing microcode to a multi-tasking environment;

means by which a single microprocessor supports a plurality of Token-Ring ports, using common instructional space.

2. The system of claim 1 wherein each individual said ports is provided with its own copy of Token Ring Register and RAM hardware; and the particular said port that said microcode works with, is determined by the value in the Port Select Register.

3. The system of claim 2 wherein said Port Select Register selects one of a plurality of RAM spaces and Token Ring copies, and said Port Select Register controls the Interrupt Multiplexor that supplies the hardware generated interrupts to said microprocessor.

4. The system of claim 2 wherein changes to said existing microprocessor design are minimized, by adding new functions around the current logic rather than modifying it.

5. The system of claim 1 wherein changes to said existing microcode that executes on the microprocessor, are minimized.

6. The system of claim 2 wherein a process or algorithm is defined for controlling multiple Token Ring Ports using microcode.

7. The system of claim 6 wherein the overhead required in time-sliced context switches is minimized, by eliminating unneeded said time-sliced context switches.

8. The system of claim 6 wherein changes to the microprocessor logic are eliminated, by saving copies of serially reusable resources in the program storage.

9. The system of claim 6 which utilizes both the highest and lowest processor interrupt priority levels to optimize performance.

10. The system of claim 1 wherein the concept of a "Hog" timer is employed to ensure that no single port will monopolize the central processing unit (CPU).

11. A method to facilitate multi-tasking of existing microcode hardware, comprising the steps of:

encapsulating said existing microcode hardware;

extending said existing microcode to a multi-tasking environment;

employing a single microprocessor to support a plurality of Token-Ring ports, using common instructional space.

12. The method of claim 11 wherein each individual port is provided with its own copy of Token Ring Register and RAM hardware; and the particular port that said microcode works with, is determined by the value in the Port Select Register.

13. The method of claim 12 wherein said Port Select Register selects one of a plurality of RAM spaces and Token Ring copies, and said Port Select Register controls the Interrupt Multiplexor that supplies the hardware generated interrupts to said microprocessor.

14. The method of claim 12 wherein changes to said existing microprocessor design are minimized, by adding new functions around the current logic rather than modifying it.

15. The method of claim 12 wherein changes to said existing microcode that executes on the microprocessor, are minimized.

16. The method of claim 11 wherein a process or algorithm is defined for controlling multiple Token Ring Ports using microcode.

17. The method of claim 16 wherein the overhead required in time-sliced context switches is minimized, by eliminating unneeded said time-sliced context switches.

18. The method of claim 16 wherein changes to the microprocessor logic are eliminated, by saving copies of serially reusable resources in the program storage.

19. The method of claim 16 wherein which utilizes both the highest and lowest processor interrupt priority levels to optimize performance.

20. The method of claim 11 wherein the concept of a "Hog" timer is employed to ensure that no single port will monopolize the central processing unit (CPU).

21. A system to reuse a single existing Token-Ring embedded processor and micro-code, for multiple ports on a chip, comprising:

means for speeding up the clocks to the embedded processor;

means for splitting up th e external Flash ROM memory in the micro-code, into diagnostics and functional code; and providing sufficient RAM on said chip to contain said code;

means of downloading said diagnostic code for said diagnostics to the card and then said functional code is downloaded to replace said diagnostic code.

22. T he system of claim 21 wherein said Flash ROM is 64 KBytes and said RAM is 32 KBytes.

23. A method to reuse a single existing Token-Ring embedded processor and micro-code, for multiple ports on a chip, comprising the steps of:

speeding up the clocks to the embedded processor;

splitting up the external Flash ROM memory in the micro-code, into diagnostics and functional code; and providing sufficient RAM on said chip to contain said code;

downloading said diagnostic code for said diagnostics, to the card and then said functional code is downloaded to replace said diagnostic code.

24. The method of claim 23 wherein said Flash ROM is 64 KBytes and said RAM is 32 KBytes.

25. A method for encapsulating a microprocessor to allow multi-tasking of existing microcode comprising the steps of:

employing a single microprocessor to support a plurality of Token-Ring ports; and using common instructional space;

providing each individual port with its own copy of Token Ring Register and RAM hardware;

selecting one of said plurality of RAM spaces and Token Ring copies;

employing a control and Interrupt means, that supplies port hardware generated interrupts to the microprocessor.

* * * * *